United States Patent
Lohtia et al.

(10) Patent No.: US 7,352,768 B2
(45) Date of Patent: Apr. 1, 2008

(54) TRAFFIC MANAGEMENT IN A HYBRID WIRELESS NETWORK HAVING MULTIPLE TYPES OF WIRELESS LINKS FOR PACKET-SWITCHED COMMUNICATIONS

(75) Inventors: Anit Lohtia, Plano, TX (US); Yuqiang Tang, Plano, TX (US); Miroslav Budic, Murphy, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1306 days.

(21) Appl. No.: 10/186,047

(22) Filed: Jun. 28, 2002

(65) Prior Publication Data
US 2004/0001461 A1    Jan. 1, 2004

(51) Int. Cl.
*H04J 3/16*    (2006.01)
(52) U.S. Cl. .................. 370/437; 370/465; 370/468
(58) Field of Classification Search ............... None
See application file for complete search history.

(56) References Cited

U.S. PATENT DOCUMENTS

| | | | |
|---|---|---|---|
| 6,542,736 B1* | 4/2003 | Parkvall et al. | 455/452.2 |
| 7,043,244 B1* | 5/2006 | Fauconnier | 455/442 |
| 2002/0067707 A1* | 6/2002 | Morales et al. | 370/331 |
| 2002/0151310 A1* | 10/2002 | Chung et al. | 455/452 |
| 2004/0022212 A1* | 2/2004 | Chowdhury et al. | 370/329 |
| 2005/0013287 A1* | 1/2005 | Wallentin et al. | 370/352 |

FOREIGN PATENT DOCUMENTS

| | | |
|---|---|---|
| WO | WO 01/58177 | 8/2001 |
| WO | WO 01/78440 | 10/2001 |
| WO | WO 02/47427 | 6/2002 |

OTHER PUBLICATIONS

3rd Generation Partneship Project, "3GPP TR 25.855 V2.0.0," pp. 1-28 (Sep. 2001).
3rd Generation Partnership Project 2, 3GPP2C.S0024, Version 2.0, "cdma2000 High Rate Packet Data Air Interface Specification," pp. 1-1-11-5 (Oct. 2000).
H. Persson et al., *Real and Potential Handover Problems in Future Wireless Networks*, Wireless 2002. Fourteenth Intl. Conf. On Wireless Communications, Proceedings of Wireless 2002, Calgary, Alta., Canada, Jul. 2002, vol. 1, pp. 347-355.

* cited by examiner

*Primary Examiner*—Phirin Sam
(74) *Attorney, Agent, or Firm*—Trop, Pruner & Hu, P.C.

(57) ABSTRACT

A wireless communications network includes cell segments each having at least a first type wireless link and a second, different type wireless link. Network access equipment is able to hand off mobile stations between the first type and second type wireless links to balance the loading of the wireless links. In one example implementation, the first type wireless link is a 1×EV wireless link, and the second type wireless link is a 1×RTT or other CDMA 2000 wireless link. The carriers can be co-located within a common cell segment, or located within different cell segments.

27 Claims, 3 Drawing Sheets

TRAFFIC MANAGEMENT IN A HYBRID WIRELESS NETWORK HAVING MULTIPLE TYPES OF WIRELESS LINKS FOR PACKET-SWITCHED COMMUNICATIONS

TECHNICAL FIELD

This invention relates generally to traffic management in a hybrid wireless network having multiple types of carriers for packet-switched communications.

BACKGROUND

Generally, mobile communications systems are made up of a plurality of cells. Each cell provides a radio communications center through which a mobile station establishes a call or other communications session with another mobile station or a terminal connected to either a circuit-switched network (e.g., public-switched telephone network or PSTN) or a packet-switched data network. Typically, each cell includes a radio base station, with each base station coupled to a switching center that controls processing of calls or other communications sessions between or among mobile stations or between mobile stations and terminals connected to a circuit-switched or a packet-switched network.

Various wireless protocols exist for defining communications in a wireless network. One type of protocol is based on the time-division multiple access (TDMA) technology, such as the TIA/EIA-136 standard or the Global System for Mobile (GSM) standard. Another type of protocol for wireless communications is based on the code-division multiple access (CDMA) technology. CDMA is a spread spectrum wireless communications protocol in which transmission is based on the spread spectrum modulation technique to allow many users to have access to the same band of carriers. Examples of other protocols include UMTS (Universal Mobile Telecommunications System) protocols (based on wideband CDMA), and the MCDV (multi-carrier data-voice) protocol that has been proposed by Nortel Networks.

Traditionally, wireless networks were designed for carrying circuit-switched voice traffic. However, with the wide availability of the Internet and intranets, packet-switched communications (e.g., web browsing, electronic mail, instant messaging, electronic gaming, and so forth) have become common. As a result, third generation (3G) and beyond wireless technologies are being developed to provide higher bandwidth and more efficient packet-switched communications (of data as well as voice and other forms of real-time data) over wireless networks.

Packet-switched wireless communications protocols have been developed for both TDMA and CDMA. For example, in the CDMA context, a CDMA 2000 family of standards has been developed that is capable of supporting both traditional circuit-switched traffic as well as packet-switched traffic.

The first phase of CDMA 2000 is referred to as 1xRTT (also referred to as 3G1x or 1x), which is designed to increase voice capacity as well as to support data transmission speeds that are faster than typically available. In addition, for even higher data rates in packet-switched communications, a High Rate Packet Data (HRPD) wireless technology has been developed. HRPD is defined as TIA/EIA/IS-856, "CDMA 2000, High Rate Packet Data Air Interface Specification," which is adopted by the TIA. The HRPD technology is also referred to as the 1xEV-DO or 1xEV technology. 1xEV-DO provides relatively high data transfer rates over the air interface between mobile stations and base stations (usually faster than 1xRTT rates).

As demands for packet-switched services increase, including requirements for higher data speeds, hybrid systems may be used in which two or more technologies are implemented in a given cell or cell sector. For example, a wireless network can use a hybrid system in which both 1xRTT and 1xEV-DO technologies are implemented. Generally, 1xEV-DO provides higher data speeds than those offered by 1xRTT. Even with such hybrid systems, under heavy traffic conditions, one or the other system (e.g., either the 1xEV-DO system or the 1xRTT system) may become overloaded, which reduces the bandwidth available to mobile stations in the wireless network.

SUMMARY

In general, method and apparatus are provided to improve the efficiency of hybrid wireless networks having at least two wireless technologies. For example, a method of wirelessly communicating in a cell segment having at least a first type wireless link that is able to support up to a first maximum data rate and a second type wireless link that is able to support up to a second maximum data rate includes monitoring a data rate requirement for wireless communication between a mobile station and wireless access equipment over the first type wireless link in the cell segment, and determining whether the data rate requirement is less than or equal to the second maximum data rate. The method hands off the mobile station from the first type wireless link to the second type wireless link in the cell segment in response to determining that the data rate requirement is less than or equal to the second maximum data rate.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
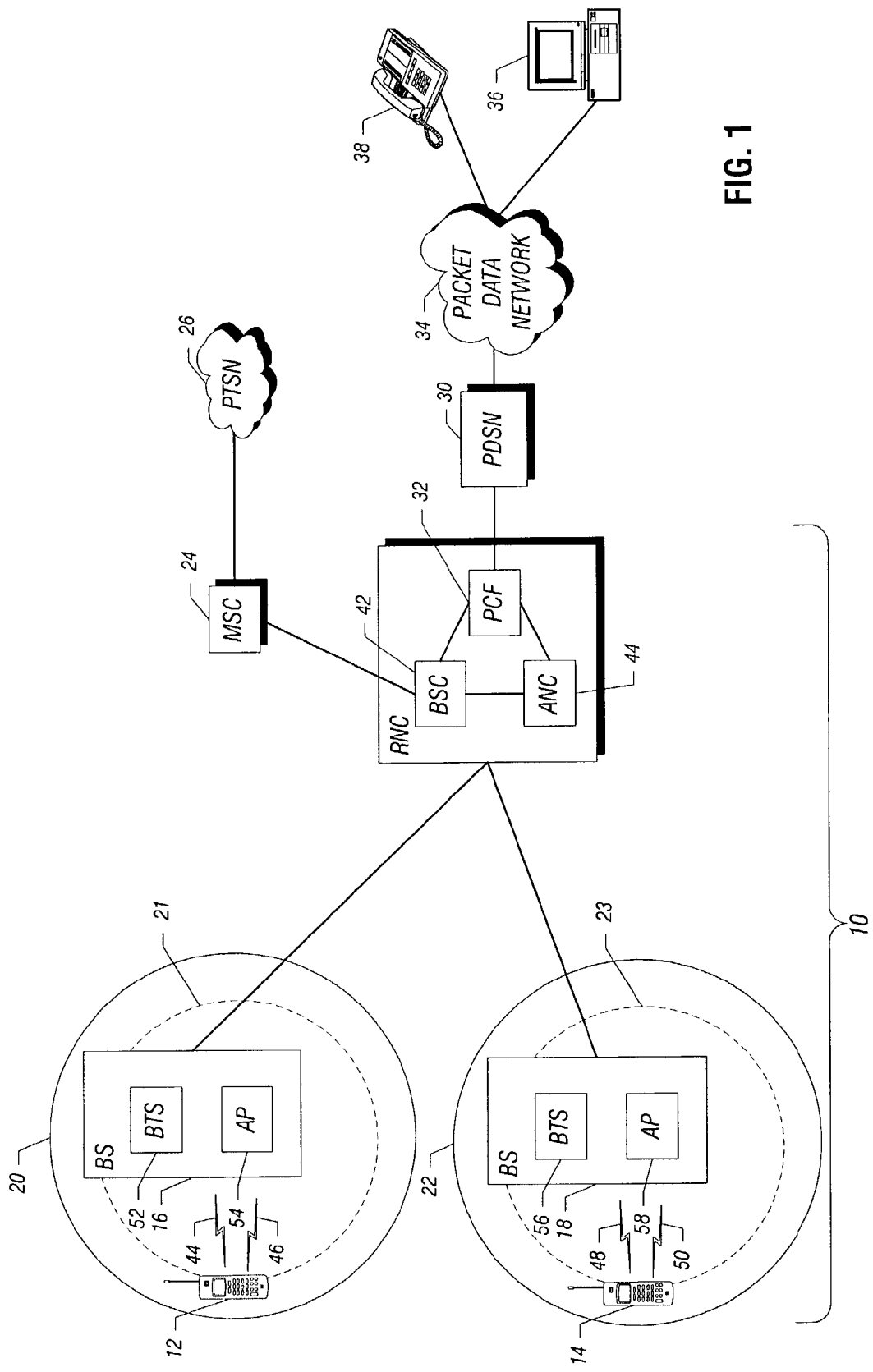
FIG. 1 is a block diagram of an example arrangement of a communications network that includes a packet data wireless network.

Referring to FIG. 1, a mobile or wireless communications network 10 includes components that operate according to the CDMA (code-division multiple access) 2000 protocol. CDMA 2000 is defined by the CDMA family of standards (collectively referred to as the IS-2000 Standard, which is developed by the Third Generation Partnership Project 2

(3GPP2)). In other embodiments, other types of wireless protocols can be used for communications in the wireless communications network.

The wireless communications network 10 is a hybrid wireless network that includes two different wireless technologies. In one embodiment, the hybrid wireless network includes a first wireless technology that supports high-speed packet-switched communications, and a second wireless technology that supports both packet-switched and circuit-switched communications. In one implementation, such a hybrid wireless network includes a 1×EV-DO technology (to support high-speed packet-switched communications) and a 1×RTT technology (to support both circuit-switched and packet-switched communications).

Generally, under most conditions, 1×EV-DO provides higher speed packet-switched communications than 1×RTT. This is generally true in the forward link from the wireless access equipment (base station 16 or 18) to mobile station 12 or 14.

The base station 16 supports communications with the mobile station 12 in one cell sector 20 over wireless links 44 and 46, while the base station 18 supports communications with the mobile station 14 in another cell sector 22 over wireless links 48 and 50. Additional cell sectors and base stations (not shown) may also be present in the wireless communications network 10. Although only one mobile station is shown in each cell sector 20 or 22, it should be understood that multiple mobile stations can be operation in each cell sector. More generally, instead of referring to a cell or cell sector, reference is made to a "cell segment," which refers to either a cell or a cell sector.

In the example implementation discussed above, in cell segment 20, the wireless link 44 is a 1×RTT wireless link, while the wireless link 46 is a 1×EV-DO link. Similarly, in the cell segment 22, the wireless link 48 is a 1×RTT link, while the wireless link 50 is a 1×EV-DO link. Thus, each cell segment has at least two different types of wireless links. As used here, two wireless links are of different "types" if they communicate using different wireless protocols.

The base station 16 includes a base transceiver subsystem (BTS) 52 for communicating 1×RTT wireless carriers over the wireless link 44 with the mobile station 12. The base station 16 also includes an access point (AP) 54 for communicating 1×EV-DO wireless carriers over wireless link 46 with the mobile station 12. Similarly, the base station 18 includes a BTS 56 and an AP 58 for communicating wireless carriers over wireless links 48 and 50, respectively.

The wireless communications network 10 also includes an integrated radio network controller (RNC) 40, which includes both a base station controller (BSC) 42 and an access network controller (ANC) 44. The BSC 42 is a 1×RTT entity, and supports circuit-switched communications between a mobile station 12 or 14 and a mobile switching center (MSC) 24. The MSC 24 performs circuit-switched communications with network elements coupled to a public switched telephone network (PSTN) 26.

The BSC 42 is also able to support packet-switched communications with a packet data network 34 through a packet control function (PCF) 32 and a packet data serving node (PDSN) 30. Similarly, the ANC 44 is capable of supporting packet-switched communications with the packet data network 34 through the PCF 32 and PDSN 30. The packet data network 34 can be coupled to various network elements, such as a network telephone 38 or a computer system 36, as shown. The network telephone 38 and the computer system 36 are capable of perform packet-switched communications, such as web browsing, electronic mail, instant messaging, and packet-switched voice or multimedia communications. It is further understood that other network elements adapted for packet-switched communications can be connected to the packet data network 34.

Examples of the data network 34 include wireline and wireless private networks (such as local area networks or wide area networks) and public networks (such as the Internet). Packet-switched communications involve communications in which data is communicated in packets or other units of data between endpoints, such as between a mobile station and another endpoint. The packets or other units of data carry payload (including user data) as well as routing information (in the form of addresses) used for routing the packets or data units over one or more paths of the network to a destination endpoint. In some embodiments, packet-switched communications are defined by the Internet Protocol (IP). One version of IP, referred to as IPv4, is described in Request for Comments (RFC) 791, entitled "Internet Protocol," dated September 1981; and another version of IP, referred to as IPv6, is described in RFC 2460, entitled "Internet Protocol, Version 6 (IPv6) Specification," dated December 1998.

The 1×EV-DO system that supports packet data services is defined in the TIA/EIA/IS-856 Standard, entitled "CDMA 2000 High Rate Packet Data Air Interface Specification." In other embodiments, other types of protocols can be employed, such as the 1×EV-DV protocol or other protocols. In the ensuing discussion, "1×EV" refers to either 1×EV-DO or 1×EV-DV. Examples of other protocols include UMTS (Universal Mobile Telecommunications System) protocols (based on wideband CDMA), and the MCDV (multi-carrier data-voice) protocol that has been proposed by Nortel Networks. A UMTS-based protocol that supports high-speed packet-switched communications is High Speed Downlink Packet Access (HSDPA), described in 3GPP TR 25.855, "High Speed Downlink Packet Access: Overall UTRAN Description."

One of the characteristics of a 1×EV wireless link is that high data rates are possible in the presence of good RF (radio frequency) conditions. Generally, the closer (in distance) that a mobile station is to a base station, the better the RF conditions due to a stronger carrier signal as well as less interference from natural obstacles (rolling terrain, woodlands, and the like) and man-made obstacles (buildings, above-ground storage facilities, and the like) and their attendant multi-path distortions, between the mobile station and the base station. Moreover, it is conceivable that the geographic reach of one carrier of a given base station may differ from the reach of another carrier located at that same base station, even within the same cell segment. As a mobile station moves further away from a base station, the data rate that can be supported on the 1×EV wireless link can be expected to be reduced due to prevailing RF conditions arising from increased separation distance between the mobile station and the base station, as well as potentially greater interference from obstacles as discussed above.

Thus, when a mobile station is far away from a base station, or whenever the RF carrier signal is weak for whatever other reason (such as the presence of natural and/or man-made obstacles in the path between the mobile station and the base station), the data rate that can be achieved on the 1×EV wireless link is usually reduced to the data rate that can be supported on a 1×RTT wireless link. In other words, in a given cell segment, when a mobile station is outside a region of good RF conditions, 1×EV carriers do not offer significant advantages (in terms of data speeds) over 1×RTT carriers. Such a region is generally illustrated by the broken circle indicated as 21 within the cell segment 20 and the broken circle 23 within cell segment 22. Note, however, that the circles 21 and 23 are provided for the sake of simplicity; in an actual cell segment, the area of coverage can have any number of shapes, depending on the type of antennas used and the presence of structures in the cell segments that act as obstacles to transmission of RF carriers.

Within the regions 21 and 23, which have relatively good RF conditions, the 1×EV wireless link offers greater spectral efficiency compared to that offered by the 1×RTT wireless link for packet-switched communications in the forward link (from the base station to the mobile station). In such regions 21 and 23, a 1×EV carrier can provide many times the capacity of a 1×RTT carrier. However, this spectral efficiency is decreased when a mobile station moves outside the region 21 or 23 of good RF conditions.

In accordance with some embodiments of the invention, each base station 16 or 18 effects a "handoff" of one or more mobile stations from a 1×EV carrier to a 1×RTT carrier when the base station determines that the 1×EV wireless link is loaded (that is, the capacity of the 1×EV wireless link has reached full capacity or has reached or is near a prescribed capacity limit). In this context, reference to "handoff" encompasses not only a transfer of a communications session from one base station to another, but also the transfer from once carrier (such as a 1×EV carrier) to another carrier (such as a 1×RTT carrier) co-located at the same base station.

The base station 16 or 18 first tries to identify mobile stations that are outside the region 21 or 23 of good RF conditions. In one embodiment, the base station identifies a mobile station as being outside the region 21 or 23 by determining the data rate requested by the mobile station on the forward link. A low data rate being requested is an indication that poor RF conditions prevent high data rates communications. However, note that a mobile station may request low data rate for other reasons.

When mobile stations that have requested low data rates are identified, one or more of those mobile stations are handed off from the 1×EV wireless link to the 1×RTT wireless link. For such mobile stations, changing carrier from 1×EV to 1×RTT does not significantly impact performance, especially if a mobile station requests a data rate on the forward link that is less than or equal to the data rate that can be supported by a 1×RTT wireless link. Once such mobile stations are handed off to a 1×RTT carrier, additional capacity is created for other mobile stations that may need the high data rates offered by the 1×EV wireless link.

Similarly, the 1×RTT wireless link can be "loaded," meaning it is at or near capacity or a prescribed capacity limit. In that scenario, the base station 16 or 18 checks to see if the 1×EV wireless link has spare capacity. If so, the base station 16 or 18 hands off mobile stations associated with high data rates from the 1×RTT wireless link to the 1×EV wireless link. This allows more efficient packet-switched communications for those mobile stations that have been handed off to the 1×EV wireless link, as well as freeing up capacity on the 1×RTT wireless link.

Figure 2:
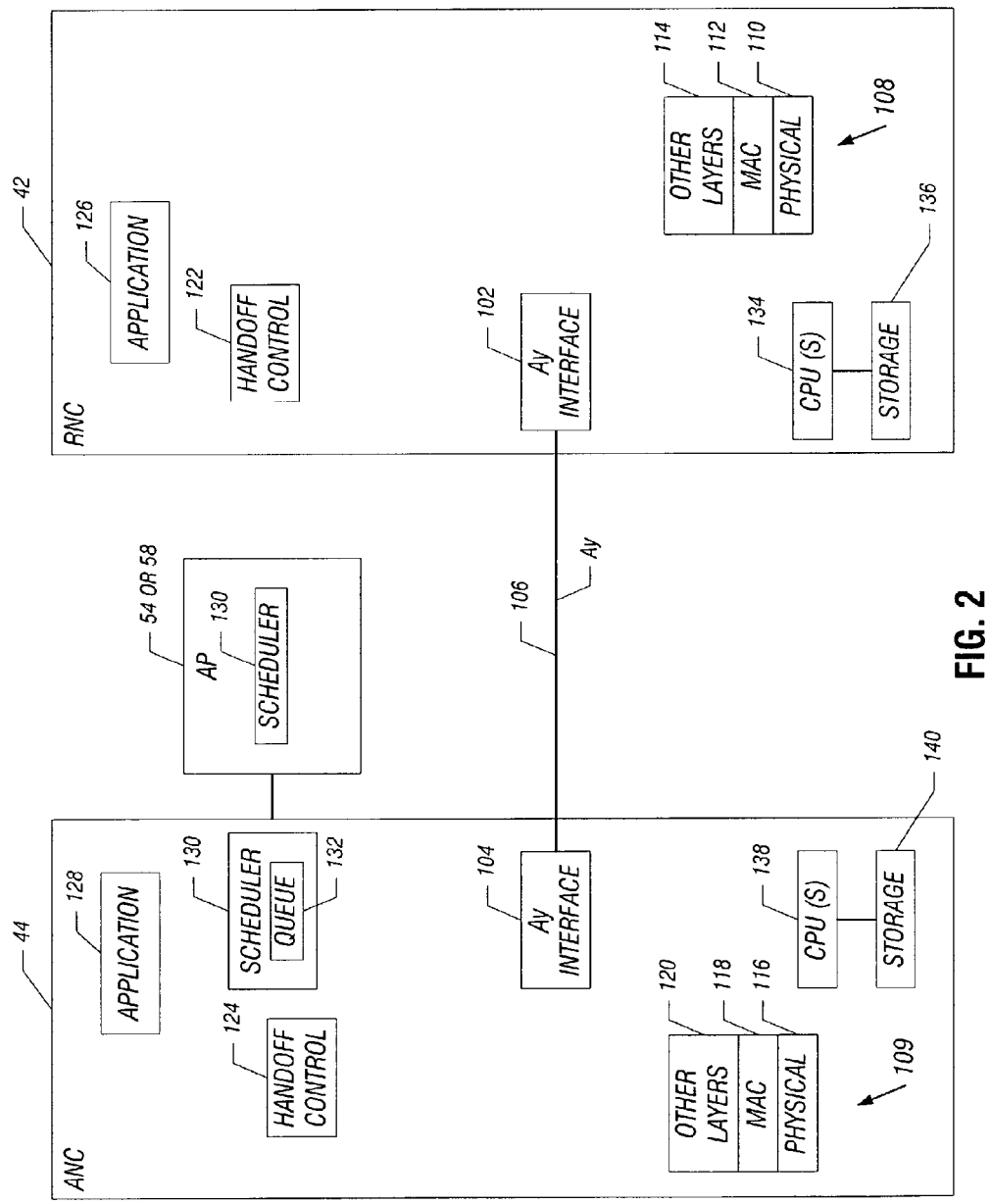
FIG. 2 is a block diagram of components of an access network controller and base station controller in the communications network of FIG. 1.

FIG. 2 illustrates some components of the BSC 42 and the ANC 44, in accordance with one example implementation. Note that other arrangements are possible in other embodiments. To communicate with each other, the BSC 42 includes an Ay interface module 102 and the ANC 44 includes an Ay interface module 104 to communicate with each other over an Ay interface 106. Signaling to perform handoffs is communicated between the ANC 44 and BSC 42 over the Ay interface 106.

The BSC 42 includes a protocol stack 108 that has a physical layer 110, a medium access control (MAC) layer 112, and other protocol layers 114 as necessary to support a given protocol. The physical layer 110 provides the actual RF signaling to communicate with mobile stations. The MAC layer 112 defines procedures used to receive and transmit over the physical layer 110. Similarly, the ANC 44 also includes a protocol stack 109 having a physical layer 116, a MAC layer 118, and other layers 120. Note that the physical layers 110 and 116 shown in FIG. 2 may actually be implemented in the BTS or AP.

Also included in the BSC 42 and ANC 44 are handoff control modules 122 and 124, respectively, for controlling the handoff procedure of a mobile station between a 1×EV wireless link and a 1×RTT wireless link, regardless of such links being co-located at same base station or at different base stations. The handoff control modules 122 and 124 may be part of one of the layers 110, 112, 114, 116, 118, and 120. Alternatively, the handoff control modules 122 and 124 can be separate from the protocol stack 108 or 109. Other components in the BSC 42 and ANC 44 include application software 126 and 128, respectively.

The ANC 44 or AP 54 or 58 also includes a scheduler 130 to schedule communications in the 1×EV forward wireless link to mobile stations. Requests stored in a queue 132 associated with the scheduler 130 are scheduled for communication over the physical resources (e.g., time slots) of the forward link based on a predetermined scheduling algorithm.

Software in the BSC 42 is executable on one or more central processing units (CPUs) 134. Data and instructions may be stored in a storage 136 associated with the BSC 42. Similarly, software on the ANC 44 is executable on one or more CPUs 138. Instructions and data may be stored in a storage 140 associated with the ANC 44.

Figures 3, 4:
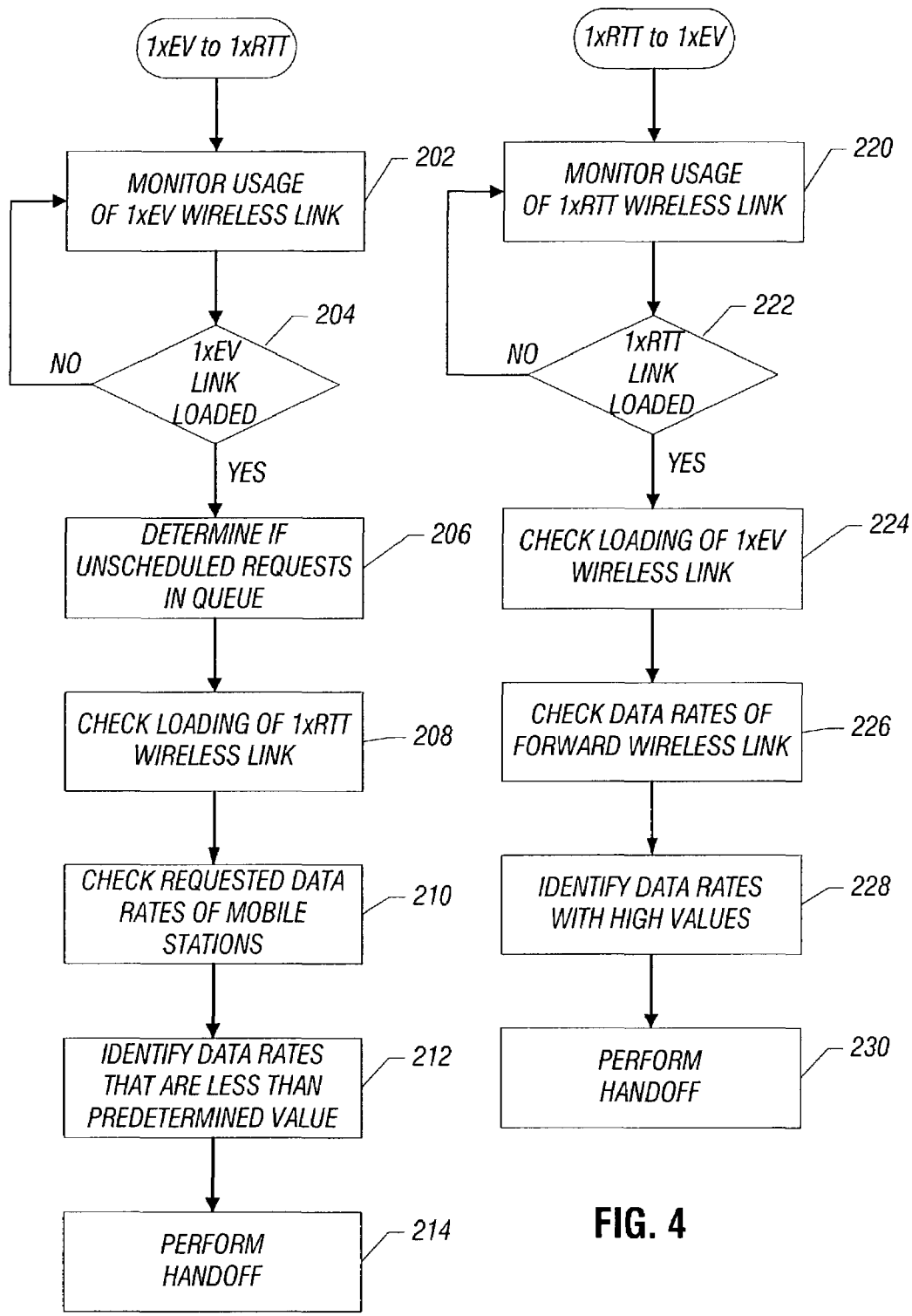
FIG. 3 is a flow diagram of a process of handing off a mobile station from a 1xEV wireless link to a 1xRTT wireless link.
FIG. 4 is a flow diagram of a process of handing off a mobile station from a 1xRTT wireless link to a 1xEV wireless link.

Referring to FIG. 3, a process for traffic management in the forward link is performed by wireless access equipment. As used here, "wireless access equipment" refers to the ANC 44, BSC 42, AP, BTS, and/or any other network entity that provides, implements, or facilitates wireless communications with mobile stations. The wireless access equipment monitors (at 202) the current usage of the 1×EV forward wireless link. This information is available at the scheduler 130. Next, the wireless access equipment determines (at 204) if the 1×EV wireless link is loaded (i.e., at full capacity or at (or near) a prescribed capacity limit). If so, the wireless access equipment determines (at 206) whether or not requests are in the scheduler queue 132 but not yet scheduled. If so, the wireless access equipment checks (at 208) the loading of the 1×RTT wireless link to determine if it may be possible (that is, the 1×RTT wireless link has spare capacity) to hand off a request of a mobile station to the 1×RTT wireless link.

The wireless access equipment then checks (at 210) data rates requested by the mobile stations for data communications in the 1×EV forward wireless link. The data rate information is carried in a data rate control (DRC) channel as defined by 1×EV. The mobile station requests the data rate to be used on the forward wireless link in the DRC channel.

The wireless access equipment then identifies (at 212) the mobile stations that have requested data rates less than a predetermined value (e.g., 153.6 kilobits per second (kbps)). The predetermined data rate value is less than the maximum data rate that can be supported by the 1×EV wireless link, and also less than or equal to a data rate that can be supported by the 1×RTT wireless link. As noted above, the maximum data rate for packet-switched communications that can be supported by a 1×EV wireless link is higher than the maximum data rate for packet-switched communications that can be supported by a 1×RTT wireless link. If the 1×RTT wireless link has spare capacity, then the wireless access equipment performs a handoff (at 216) to hand off one or more of the identified mobile stations from the 1×EV wireless link to the 1×RTT wireless link. As has been noted previously, this handoff can be implemented between different carriers located within a single base station, as well as between different carriers of different base stations.

Effectively, in response to determining that a first type wireless link (e.g., 1×EV wireless link) is loaded (has reached capacity or nearing capacity), the wireless access equipment identifies mobile stations that can be handed off to a second type wireless link (e.g., 1×RTT wireless link). The first type wireless link can support up to a first maximum data rate, and the second type wireless link can support up to a second maximum data rate (which is less than the first maximum data rate). Mobile stations that can be identified for handoff are those that have requested data rates less than or equal to the second maximum data rate.

A similar procedure is performed in the reverse scenario (that is, from the 1×RTT wireless link to the 1×EV-DO wireless link). The wireless access equipment monitors (at 220) usage of the 1×RTT wireless link. If the wireless access equipment determines (at 222) that the 1×RTT wireless link is loaded (interference levels rise and physical resources run out), then the wireless access equipment checks (at 224) the loading of the 1×EV wireless link. In response to detecting that the 1×EV wireless link has spare capacity, the wireless access equipment checks (at 226) the forward link data rates (set by the 1×RTT BSC). The wireless access equipment identifies (at 228) the requests with the highest data rates. A request with a high data rate can benefit the most from being handed off to the 1×EV wireless link. Thus, the identified mobile stations are handed off (at 230) from the 1×RTT wireless link to the 1×EV wireless link.

By using techniques according to some embodiments of the invention, load balancing can be performed between or among multiple types of wireless links within a cell segment. In the embodiments discussed above, two different types of wireless links include the 1×EV and 1×RTT wireless links. Other types of wireless links can be used in other embodiments. Load balancing is achieved by handing off mobile stations from one type of wireless link to the other type of wireless link when it is determined that one wireless link is loaded and the other wireless link has spare capacity. To maintain optimal performance, mobile stations are handed off from one type of wireless link to another type of wireless link only if the target wireless link can achieve the data rate that is requested by the mobile station that is being handed off. Additionally, a mobile station can be handed off from one type of wireless link to another type of wireless link if it is determined that the mobile station can benefit by moving to a wireless link with a higher data rate capacity.

Instead of referring to handoffs of mobile stations between different types of wireless links, other embodiments may involve the handoffs of different call or communications sessions between different types of wireless links.

The tasks performed by the wireless access equipment or mobile stations are provided by software routines or modules in the wireless access equipment or mobile stations. Instructions of such software routines or modules are stored on one or more storage devices in the corresponding systems and loaded for execution on corresponding control units or processors. The control units or processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software are loaded or transported to each entity in one of many different ways. For example, code segments including instructions stored on floppy disks, CD or DVD media, a hard disk, or transported through a network interface card, modem, or other interface device are loaded into the entity and executed as corresponding software routines or modules. In the loading or transport process, data signals that are embodied in carrier waves (transmitted over telephone lines, network lines, wireless links, cables, and the like) communicate the code segments, including instructions, to the entity. Such carrier waves are in the form of electrical, optical, acoustical, electromagnetic, or other types of signals.

While the invention has been disclosed with respect to a limited number of embodiments, those skilled in the art will appreciate numerous modifications and variations there from. It is intended that the appended claims cover such modifications and variations as fall within the true spirit and scope of the invention.

What is claimed is:

1. A method of wirelessly communicating in a cell segment having at least two different types of wireless links, including a first type wireless link that is capable of supporting up to a first maximum data rate and a second type wireless link that is capable of supporting up to a second maximum data rate, the second maximum data rate being less than the first maximum data rate, the method comprising:

monitoring a data rate requirement for wireless communication between a mobile station and wireless access equipment over the first type wireless link in the cell segment;

determining whether the data rate requirement is less than or equal to the second maximum data rate; and handing off the mobile station from the first type wireless link to the second type wireless link in the cell segment in response to determining that the data rate requirement is less than or equal to the second maximum data rate.

2. The method of claim 1, further comprising receiving the data rate requirement from the mobile station.

3. The method of claim 1, comprising performing the handoff to increase capacity on the first type wireless link for other requests.

4. The method of claim 1, wherein handing off the mobile station from the first type wireless link to the second type wireless link comprises handing off the mobile station from a 1×EV wireless link to the second type wireless link.

5. The method of claim 4, wherein handing off the mobile station from the 1×EV wireless link to the second type wireless link comprises handing off from the 1×EV wireless link to a 1×RTT wireless link.

6. The method of claim 1, wherein monitoring the data rate requirement comprises monitoring the data rate requirement in a data rate control (DRC) channel from the mobile station.

7. The method of claim 1, further comprising determining whether the first type wireless link is at or near a prescribed capacity limit.

8. The method of claim 7, further comprising checking whether the second type wireless link has spare capacity, wherein performing the handoff is further in response to determining the second type wireless link has spare capacity.

9. The method of claim 1, wherein monitoring the data rate requirement comprises monitoring the data rate requirement of a first mobile station, the method further comprising:
   monitoring a second data rate requirement of a second mobile station that is communicating over the first type wireless link;
   selecting one of the first and second mobile stations to hand off to the second type wireless link, and
   handing off the selected one of the first and second mobile stations to the second type wireless link.

10. The method of claim 1, wherein handing off the mobile station from the first type wireless link to the second type wireless link in the cell segment comprises handing off the mobile station between different types of carriers located within a common cell segment.

11. An article comprising at least one storage medium containing instructions that when executed cause a system to:
   monitor usage of a first type wireless link;
   determine whether the first type wireless link has reached capacity or is nearing capacity; and
   identify, in response to determining that the first type wireless link has reached capacity or is nearing capacity, a second, different type wireless link to which a communications session can be transferred if a specified data rate of wireless communication along the first type of wireless link is less than or equal to a maximum data rate established for the second type wireless link.

12. The article of claim 11, wherein the first type wireless link has a higher data rate capacity than the second type wireless link, wherein the instructions when executed cause the system to further hand off the communications session from the first type wireless link to the second type wireless link to increase capacity on the first type wireless link.

13. The article of claim 12, wherein handing off the communications session from the first type wireless link to the second type wireless link comprises handing off from a 1×EV wireless link to the second type wireless link.

14. The article of claim 13, wherein handing off the communications session from the ixEY wireless link to the second type wireless link comprises handing off from the 1×EV wireless link to a 1×RTT wireless link.

15. The article of claim 11, wherein the instructions when executed cause the system to further receive the specified data rate from a mobile station.

16. The article of claim 15, wherein receiving the specified data rate from the mobile station comprises receiving the specified data rate in a data rate control (DRC) channel according to a 1×EV protocol.

17. The article of claim 16, wherein the instructions when executed cause the system to further:
   monitor usage of the second type wireless link;
   determine if the second type wireless link has reached capacity or is nearing capacity; and
   hand off a second communications session from the second type wireless link to the first type wireless link in response to determining that the second type wireless link has reached capacity or is nearing capacity.

18. The article of claim 17, wherein the first type wireless link has a higher data rate capacity than the second type wireless link, and
   wherein the instructions when executed cause the system to identify the communications session to hand off from the second type wireless link to the first type wireless link in response to the second communications session having a data rate requirement that is greater than other communications sessions.

19. The article of claim 11, wherein the instructions when executed cause the system to further hand off the communications session from the first type wireless link to the second type wireless link, both the first and second type wireless links being located in a common cell segment.

20. An apparatus for use in a cell segment having a first type wireless link and a second type wireless link, the first type wireless link capable of supporting a first maximum data rate, and the second type wireless link capable of supporting a second maximum data rate that is less than the first maximum data rate, the apparatus comprising:
   an interface to wirelessly conimunicate with mobile stations over the first type wireless link in the cell segment; and
   a controller adapted to:
      receive data rate requirements of the mobile stations,
      identify a first one of the mobile stations that has a data rate requirement that is less than or equal to the second maximum data rate, and
      hand off the identified first mobile station from the first type wireless link to the second type wireless link.

21. The apparatus of clalm 20, wherein the first type wireless link comprises a 1×EV wireless link.

22. The apparatus of clalm 21, wherein the second type wireless link comprises a CDMA 2000 wireless link.

23. The apparatus of claim 21, wherein the second type wireless link comprises a 1×RTT wireless link.

24. The apparatus of claim 20, wherein the controller is adapted to receive the data rate requirements in data rate control (DRC) channels from the mobile stations.

25. The apparatus of claim 20, wherein the controller is adapted to further determine that the first type wireless link is loaded, wherein the controller is adapted to perform the handoff is further in response to determining the first type wireless link is loaded.

26. The apparatus of claim 25, wherein the controller is adapted to further check that the second type wireless link has spare capacity, wherein the controller is adapted to perform the handoff further in response to determining the second type wireless link has spare capacity.

27. The apparatus of claim 20, wherein hand off of the identified first mobile station is performed from the first type wireless link to the second type wireless link that are located in a common cell segment.

* * * * *